United States Patent
Erhart et al.

(10) Patent No.: US 7,085,264 B2
(45) Date of Patent: Aug. 1, 2006

(54) SYSTEM AND METHOD FOR CONTROLLING MEDIA GATEWAYS THAT INTERCONNECT DISPARATE NETWORKS

(75) Inventors: Wesley R. Erhart, McKinney, TX (US); Christopher L. Welch, Murphy, TX (US); Paul H. Boudreaux, Garland, TX (US)

(73) Assignee: Nortel Networks Limited, St. Laurent (CA)

( * ) Notice: Subject to any disclaimer, the term of this patent is extended or adjusted under 35 U.S.C. 154(b) by 1121 days.

(21) Appl. No.: 10/024,443

(22) Filed: Dec. 18, 2001

(65) Prior Publication Data

US 2003/0112788 A1   Jun. 19, 2003

(51) Int. Cl.
*H04L 12/66* (2006.01)
(52) U.S. Cl. .................................... 370/356; 370/401
(58) Field of Classification Search ............... 370/345, 370/356, 397, 395.2, 401
See application file for complete search history.

(56) References Cited

U.S. PATENT DOCUMENTS

| | | | |
|---|---|---|---|
| 6,683,877 B1* | 1/2004 | Gibbs et al. | 370/395.2 |
| 6,795,437 B1* | 9/2004 | Rasanen et al. | 370/395.1 |
| 6,799,210 B1* | 9/2004 | Gentry et al. | 709/223 |
| 6,956,820 B1* | 10/2005 | Zhu et al. | 370/230.1 |
| 6,963,558 B1* | 11/2005 | Sylvain | 370/352 |
| 6,985,734 B1* | 1/2006 | Niska | 455/445 |
| 2001/0053145 A1* | 12/2001 | Willars et al. | 370/352 |
| 2002/0110104 A1* | 8/2002 | Surdila et al. | 370/338 |
| 2003/0091032 A1* | 5/2003 | Laxman et al. | 370/352 |
| 2003/0099241 A1* | 5/2003 | Kekki et al. | 370/395.2 |
| 2003/0169751 A1* | 9/2003 | Pulkka et al. | 370/401 |
| 2004/0013108 A1* | 1/2004 | Ruckstuhl | 370/352 |

* cited by examiner

*Primary Examiner*—Min Jung
(74) *Attorney, Agent, or Firm*—Haynes and Boone, LLP

(57) ABSTRACT

A system and method for controlling media gateways that interconnect disparate networks is disclosed. In a preferred embodiment, the method comprises receiving a request for a circuit service call channel, the request comprising information identifying a media gateway selected out of a plurality of media gateways, the selected media gateway having a TDM circuit selected out of a plurality of TDM circuits associated with it; selecting an ATM VCC from a plurality of ATM VCCs associated only with the selected media gateway; and transmitting an Establish Request to a Q.2630 module of a signaling gateway.

42 Claims, 1 Drawing Sheet

SYSTEM AND METHOD FOR CONTROLLING MEDIA GATEWAYS THAT INTERCONNECT DISPARATE NETWORKS

TECHNICAL FIELD OF THE INVENTION

The present invention relates generally to the field of telecommunications, and more particularly to a system and method for controlling media gateways that interconnect disparate networks.

BACKGROUND OF THE INVENTION

The Universal Mobile Telecommunications System (UMTS) specifies Q.2630 as the control protocol used for establishing and releasing circuit switched Application Adaptation Layer type 2 (AAL-2) bearer channels. UMTS voice and circuit switched data are carried in a compressed discontinuous manner. These streams are ideal candidates for AAL-2 Virtual Channel Connections (VCCs).

ITU-T Q.2630 is a transport control protocol designed to control ATM (Asynchronous Transfer Mode) AAL-2 connections. AAL-2 provides for multiplexing multiple low bit rate and low latency data streams onto a single ATM virtual circuit. Q.2630 defines an AAL-2 VCC as a path. A path is identified by a Path Identity (PID). A single path carries multiple AAL-2 channels, each channel referenced by a Channel Identifier (CID).

ATM AAL-2 connections may be controlled by the Q.2630 bearer control protocol. Transmission savings may be realized by carrying voice traffic generated in a Time Division Multiplexed (TDM) network over a more efficient AAL-2 ATM network. At the transition from the TDM network to the AAL-2 network, a media gateway acts as an interface between the AAL-2 channel and the TDM channel.

When a voice path is to be established between a calling party and a called party, the call originating and call terminating nodes may select different communication paths. For example, the originating node may select a TDM circuit associated with a particular media gateway while the terminating node may select an ATM VCC associated with a different media gateway. This causes a problem in establishing the voice path which may require the use of switching equipment between the media gateways.

SUMMARY OF THE INVENTION

Accordingly, there is a need in the art for a system and method for controlling media gateways that interconnect disparate networks, for example a packet network, such as an Asynchronous Transfer Mode (ATM) network, and a Time Division Multiplexed (TDM) network. In the preferred embodiment, this is accomplished by modifying a channel selection procedure for a call terminating node. In the preferred embodiment, this is accomplished by modifying the Q.2630 channel selection procedure for the call terminating node such that the ATM channel is selected from a subset of channels associated with the media gateway which is associated with the TDM circuit selected by the call originating node.

In accordance with an embodiment of the present invention, a system for controlling media gateways is disclosed. The system comprises a Mobile Switching Center (MSC) operable to select a TDM circuit associated with a media gateway of a plurality of media gateways in response to receiving a circuit service call setup request from a mobile system. The system also comprises a signaling gateway operable to translate an address of the selected TDM circuit into an address of the media gateway with which the selected TDM circuit is associated. The system further comprises a Radio Network Controller (RNC) operable to select an ATM Virtual Channel Connection (VCC) of a plurality of ATM VCCs associated only with the media gateway based at least in part on the address of the selected media gateway, in response to receiving a request for a channel, the RNC further operable to transmit information regarding a selected channel of the selected ATM VCC to the MSC for establishment of circuit service call.

In accordance with another embodiment of the present invention, a method for selecting a circuit service call channel is disclosed. The method comprises receiving a request for a circuit service call channel, the request comprising information identifying a media gateway selected out of a plurality of media gateways, the selected media gateway having a TDM circuit selected out of a plurality of TDM circuits associated with it; selecting an ATM VCC from a plurality of ATM VCCs associated only with the selected media gateway; and transmitting an Establish Request (ERQ) to a Q.2630 module of a signaling gateway.

Other aspects and features of the invention will become apparent to those ordinarily skilled in the art upon review of the following description of specific embodiments of the invention in conjunction with the accompanying figures.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

Figure 1:
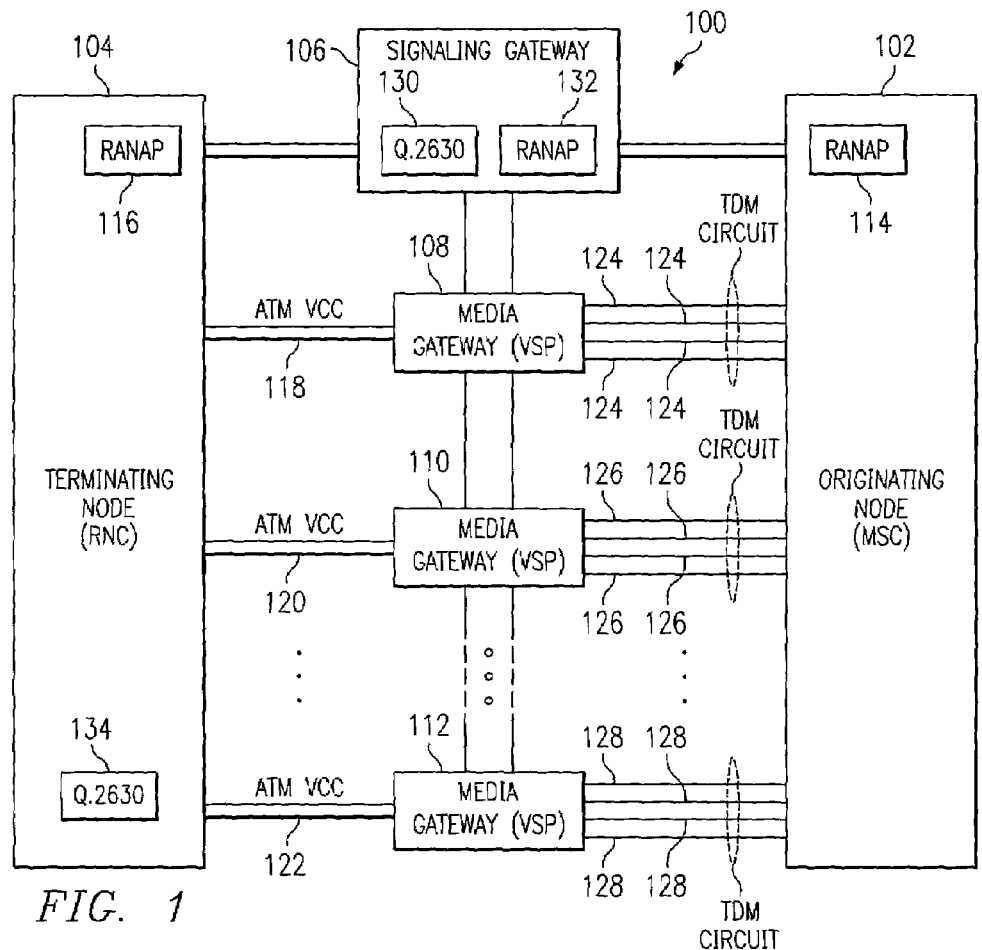
FIG. 1 is a schematic diagram of a system for controlling media gateways that interconnect disparate networks according to a preferred embodiment of the present invention.
Figure 2:
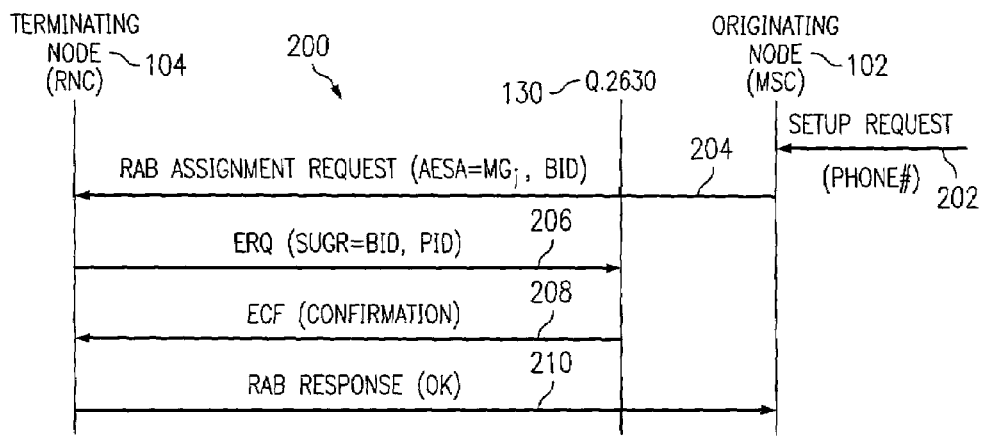
FIG. 2 is a preferred embodiment dataflow diagram for controlling media gateways that interconnect disparate networks.

The preferred embodiment of the present invention and its advantages are best understood by referring to FIGS. 1 through 2 of the drawings.

FIG. 1 is a schematic diagram of a system 100 for controlling media gateways that interconnect disparate networks according to a preferred embodiment of the present invention. System 100 comprises a call originating node 102, a call terminating node 104, a signaling gateway 106, and a plurality of media gateways 108, 110 and 112. Call originating node 102 is preferably coupled to signaling gateway 106 and media gateways 108, 110 and 112. Call terminating node 104 is preferably coupled to signaling gateway 106 and media gateways 108, 110 and 112.

Call originating node 102 is preferably a legacy Time Division Multiplexed (TDM) element, such as a Mobile Switching Center (MSC) that includes a RANAP (Radio Access Network Application Protocol) module 114. Call terminating node 104 is preferably a Radio Network Controller (RNC) that includes a RANAP module 116 and a Q.2630 module 134. RANAP modules 114 and 116 terminate the RANAP signaling. The RANAP layer preferably carries the messaging between a mobile system and the MSC and also the messaging between the RNC and the MSC. Signaling gateway 106 preferably comprises a Q.2630 module 130 and a RANAP module 132. Media gateways 108, 110 and 112 are each preferably a Voice Signal Processor (VSP). Each media gateway is assigned an AAL-2 End Station Address (AESA).

One or more packetized voice or data connections, such as ATM Virtual Channel Connections (VCCs) 118, 120, and 122, for example one or more AAL-2 VCCs, couple each media gateway to RNC 104. Each AAL-2 VCC is assigned a Virtual Channel Identifier (VCI) which is used as the VCC's Path Identity (PID). There is no mechanism to force the PIDs of VCCs on different media gateways to be unique even if the media gateways are associated with the same RNC. Thus, VCCs on different media gateways may have the same PID. Each VCC comprises one or more channels. Each channel is assigned a Channel Identifier (CID). In the embodiment illustrated in FIG. 1, ATM VCC 118 couples media gateway 108 to RNC 104, ATM VCC 120 couples media gateway 110 to RNC 104 and ATM VCC 122 couples media gateway 112 to RNC 104.

One or more TDM circuits 124, 126 and 128 couple each media gateway to MSC 102. In the embodiment illustrated in FIG. 1, TDM circuits 124 couple media gateway 108 to MSC 102, TDM circuits 126 couple media gateway 110 to MSC 102 and TDM circuits 128 couple media gateway 112 to MSC 102.

FIG. 2 is a preferred embodiment dataflow diagram 200 for controlling media gateways that interconnect disparate networks. MSC 102 receives a circuit service call setup request 202 from a mobile system. Setup request 202 is preferably a request for establishing a voice path and preferably includes the phone number of the called party. If desired, in an alternative embodiment, setup request 202 may be a request for establishing a data path, for example a circuit switched data path. Setup request 202 is preferably carried in a RANAP message. MSC 102 selects a TDM resource, for example one of the TDM circuits 124, 126 or 128 on one of the media gateways 108, 110 or 112 at the edge of the ATM network.

MSC 102 transmits a RAB (Radio Access Bearer) assignment request 204 to RNC 104 preferably via signaling gateway 106. RAB assignment request 204 is preferably carried in a RANAP message. MSC 102 adds a unique Bind Identity (BID) to the RAB assignment request. The BID identifies the TDM circuit that the AAL-2 channel should bind to. If desired, the BID may also identify the associated RANAP transaction. The RAB request is preferably a request for a circuit switched channel, for example a voice channel, a data channel, and/or the like. Signaling gateway 106 controlling the media gateway with which the selected TDM circuit is associated translates the selected TDM circuit address into an AAL-2 End Station Address (AESA) of the media gateway. The AESA of the selected media gateway includes a media gateway identifier $MG_i$ identifying the media gateway associated with the selected TDM circuit.

RNC 104 selects an ATM VCC based at least in part on the AESA included in RAB request 204. Preferably, RNC 104 is limited to selecting an ATM VCC from the plurality of ATM VCCs that couple RNC 104 with the media gateway associated with the selected TDM circuit only. This ensures that the TDM circuit selected by MSC 102 and the ATM VCC selected by RNC 104 are each coupled to the same media gateway.

Q.2630 module 134 on RNC 104 then transmits an Establish Request (ERQ) 206 to Q.2630 module 130 on signaling gateway 106. ERQ 206 is preferably a request for an ATM channel, for example an AAL-2 channel. As mentioned above each ATM VCC has a PID assigned to it. ERQ 206 includes a Served User Generated Reference (SUGR) parameter that includes the BID assigned to the selected TDM resource by call originating node 102. ERQ 206 preferably also includes the PID of the selected ATM VCC.

An available channel is selected from the ATM VCC. Signaling gateway 106 sends control messaging to the media gateway with which the selected TDM circuit is associated instructing it to connect the TDM circuit identified with the BID to the AAL-2 channel identified by the channel ID. If successful, signaling gateway 106 sends an Establish Confirmation (ECF) message 208 back to RNC 104. RNC 104 transmits RAB response 210 back to MSC 102. MSC 102 switches the voice path to the selected media gateway. Thus, the voice path is established.

By restricting the ATM network's AAL-2 path selection to a set of AAL-2 VCCs that fall on the media gateway associated with the TDM circuit selected by the TDM network, the cost of switching in the media gateway between the ATM and TDM networks is avoided. This allows production of less costly and more scalable media gateways.

The preferred embodiment of the present invention allows for optimization of ATM to TDM gateways without modification of the legacy TDM element, for example the MSC. In the preferred embodiment, the need for switching equipment between the media gateways is eliminated. Additionally, media gateways may be added as desired allowing for a scalable transition point between the two networks.

Although the preferred embodiment of the present invention has been described herein with reference to ATM and TDM networks, the invention is not so limited. If desired, the teachings of the present invention may be utilized with reference to other types of network. For example, in an alternative embodiment, the TDM network may replaced by another ATM network. In such an embodiment, the system for controlling media gateways comprises an MSC operable to select an AAL-2 path associated with a media gateway of a plurality of media gateways in response to receiving a circuit service call setup request, for example a voice path setup request, a circuit switched data path setup request, and/or the like, from a mobile system. The system also comprises a signaling gateway operable to translate an address of the selected AAL-2 path, for example a BID identifying the selected AAL-2 path, into an address of the media gateway, for example an AESA including an identifier identifying the media gateway, with which the selected AAL-2 path is associated. The system further comprises an RNC operable to select an ATM VCC of a plurality of ATM VCCs associated only with the selected media gateway in response to receiving a request for a channel, for example a RAB assignment request. The RNC is further operable to transmit information regarding a selected channel of the selected ATM VCC to the MSC for establishment of the circuit service call.

The system further comprises a first Q.2630 module operable to receive an establish request for the selected channel from a Q.2630 module of the RNC. The establish request comprises a PID of the selected ATM VCC and a BID of the selected AAL-2 path.

While the invention has been particularly shown and described by the foregoing detailed description, it will be understood by those skilled in the art that various other changes in form and detail may be made without departing from the spirit and scope of the invention.

What is claimed is:

1. A system for controlling media gateways, comprising:
a Mobile Switching Center (MSC) operable to select a Time Division Multiplexed (TDM) circuit associated with a media gateway of a plurality of media gateways in response to receiving a circuit service call setup request from a mobile system;
a signaling gateway operable to translate an address of said selected TDM circuit into an address of said media gateway with which said selected TDM circuit is associated; and
a Radio Network Controller (RNC) operable to select an ATM Virtual Channel Connection (VCC) of a plurality of ATM VCCs associated only with said media gateway based at least in part on said address of said selected media gateway, in response to receiving a request for a channel, said RNC further operable to transmit information regarding a selected channel of said selected ATM VCC to said MSC for establishment of said circuit service call.

2. The system of claim 1, wherein said circuit service call setup request comprises a phone number for a called party.

3. The system of claim 1, wherein said circuit service call setup request comprises a voice path setup request.

4. The system of claim 1, wherein said circuit service call setup request comprises a data path setup request.

5. The system of claim 1, wherein said circuit service call setup request comprises a circuit switched data path setup request.

6. The system of claim 1, wherein said address of said selected TDM circuit is a Bind Identity (BID) identifying the selected TDM circuit.

7. The system of claim 1, wherein said selected channel is a voice channel.

8. The system of claim 1, wherein said request for said channel is a Radio Access Bearer assignment request.

9. The system of claim 1, wherein said address of said media gateway is an Application Adaptation Layer type 2 (AAL-2) End Station Address (AESA).

10. The system of claim 9, wherein said AESA includes a media gateway identifier identifying said media gateway.

11. The system of claim 1, wherein said selected channel of said ATM VCC comprises an AAL-2 channel.

12. The system of claim 1, further comprising a first Q.2630 module operable to receive an establish request for said selected channel of said selected ATM VCC from a Q.2630 module of said RNC.

13. The system of claim 12, wherein said establish request comprises a Path Identity (PID) of said selected ATM VCC and a Bind Identity (BID) of said selected TDM circuit.

14. The system of claim 12, said signaling gateway further operable to communicate a control message to said media gateway to connect said TDM circuit and said selected channel.

15. The system of claim 14, said signaling gateway further operable to communicate a confirmation message to said RNC upon successful connection of said selected TDM circuit and said selected channel.

16. A method for selecting a circuit service call channel, comprising:
receiving a request for a circuit service call channel, said request comprising information identifying a media gateway selected out of a plurality of media gateways, said selected media gateway having a Time Division Multiplexed (TDM) circuit selected out of a plurality of TDM circuits associated with it; and
selecting an Asynchronous Transfer Mode (ATM) Virtual Circuit Channel Connection (VCC) from a plurality of ATM VCCs associated only with said selected media gateway; and
transmitting an Establish Request (ERQ) to a Q.2630 module of a signaling gateway.

17. The method of claim 16, said receiving step comprising receiving a request for a channel selected from the group consisting of a voice channel and a data channel.

18. The method of claim 16, further comprising selecting an ATM channel from said selected ATM VCC.

19. The method of claim 18, further comprising connecting said selected ATM channel to said selected TDM circuit.

20. The method of claim 16, wherein said ERQ comprises a Path Identity (PID) of said selected ATM VCC and a Bind Identity (BID) of said selected TDM circuit.

21. The method of claim 20, further comprising:
receiving an Establish Confirmation (ECF) message from said Q.2630 module upon successful connection of said selected TDM circuit and an ATM channel of said ATM VCC.

22. The method of claim 21, further comprising communicating a control message, by said signaling gateway, to said selected media gateway to connect said selected TDM circuit identified by said BID and said ATM channel.

23. The method of claim 16, further comprising transmitting a Radio Access Bearer (RAB) response to a Mobile Switching Center (MSC) from which said request for said circuit service call channel was received.

24. A method for controlling media gateways, comprising:
receiving a circuit service call setup request from a mobile system;
selecting, by a Mobile Switching Center (MSC), a Time Division Multiplexed (TDM) circuit of a plurality of TDM circuits associated with a media gateway of a plurality of media gateways in response to receiving said circuit service call setup request;
transmitting a request for a circuit switched channel to a Radio Network Controller (RNC) via a signaling gateway, said request including an address of said selected TDM circuit;
selecting an ATM Virtual Channel Connection (VCC) of a plurality of ATM VCCs associated only with said media gateway; and
transmitting information regarding an ATM channel of said selected ATM VCC to said MSC for establishment of said circuit service call.

25. The method of claim 24, further comprising translating, by said signaling gateway, said address of said selected TDM circuit into an address of said media gateway with which said selected TDM circuit is associated.

26. The method of claim 24, further comprising transmitting an establish request for said ATM channel to a Q.2630 module of said signaling gateway, said establish request comprising a Path Identity (PID) of the selected ATM VCC and a Bind Identity (BID) of the selected TDM circuit.

27. The method of claim 26, further comprising:
communicating a control message from said signaling gateway to said media gateway to connect said selected TDM circuit identified by said BID and said ATM channel identified by a Channel Identifier (CID); and
upon successful connection receiving, by said RNC, a confirmation message.

28. The method of claim 24, further comprising assigning a bind identity to said selected TDM circuit by said MSC.

29. A system for controlling media gateways, comprising:
a plurality of media gateways, each of said plurality of media gateways having a plurality of TDM circuits associated with it;
a call originating node operable to select a Time Division Multiplexed (TDM) circuit associated with a media gateway of said plurality of media gateways in response to receiving a circuit service call setup request from a mobile system;
a signaling gateway comprising a Q.2630 module operable to control said plurality of media gateways; and
a call terminating node operable to select an ATM Virtual Channel Connection (VCC) of a plurality of ATM VCCs associated only with said media gateway, in response to receiving a request for a channel, said call terminating node further operable to transmit information regarding a selected channel of said selected ATM VCC to said call originating node for establishment of said circuit service call.

30. The system of claim 29, said signaling gateway further operable to translate an address of said selected TDM circuit into an address of said media gateway with which said selected TDM circuit is associated.

31. The system of claim 29, wherein said call originating node comprises a Mobile Switching Center.

32. The system of claim 29, wherein said call terminating node comprises a Radio Network Controller.

33. The system of claim 29, wherein said circuit service call setup request comprises a voice path setup request.

34. A system for controlling media gateways, comprising:
a Mobile Switching Center (MSC) operable to select an Application Adaptation Layer type 2 (AAL-2) path associated with a media gateway of a plurality of media gateways in response to receiving a circuit service call setup request from a mobile system;
a signaling gateway operable to translate an address of said selected AAL-2 path into an address of said media gateway with which said selected AAL-2 path is associated; and
a Radio Network Controller (RNC) operable to select an ATM Virtual Channel Connection (VCC) of a plurality of ATM VCCs associated only with said media gateway based at least in part on said address of said selected media gateway, in response to receiving a request for a channel, said RNC further operable to transmit information regarding a selected channel of said selected ATM VCC to said MSC for establishment of said circuit service call.

35. The system of claim 34, wherein said circuit service call setup request comprises a voice path setup request.

36. The system of claim 34, wherein said circuit service call setup request comprises a circuit switched data path setup request.

37. The system of claim 34, wherein said address of said selected AAL-2 path is a Bind Identity (BID) identifying the selected AAL-2 path.

38. The system of claim 34, wherein said request for said channel is a Radio Access Bearer assignment request.

39. The system of claim 34, wherein said address of said media gateway is an Application Adaptation Layer type 2 (AAL-2) End Station Address (AESA).

40. The system of claim 39, wherein said AESA includes a media gateway identifier identifying said media gateway.

41. The system of claim 34, further comprising a first Q.2630 module operable to receive an establish request for said selected channel of said selected ATM VCC from a Q.2630 module of said RNC.

42. The system of claim 41, wherein said establish request comprises a Path Identity (PID) of said selected ATM VCC and a Bind Identity (DID) of said selected AAL-2 path.

* * * * *